June 23, 1936.  W. J. BESLER  2,044,767
TRUCK FOR RAIL VEHICLES AND THE LIKE
Filed March 6, 1934   2 Sheets-Sheet 1

Inventor
William J. Besler
By
Attorney

June 23, 1936.  W. J. BESLER  2,044,767
TRUCK FOR RAIL VEHICLES AND THE LIKE
Filed March 6, 1934   2 Sheets-Sheet 2
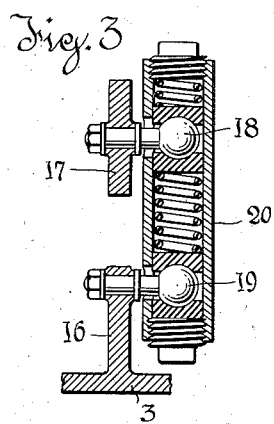
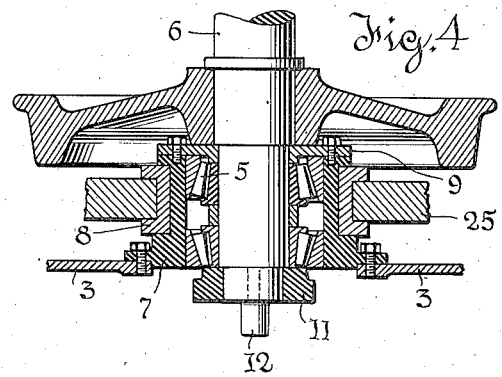
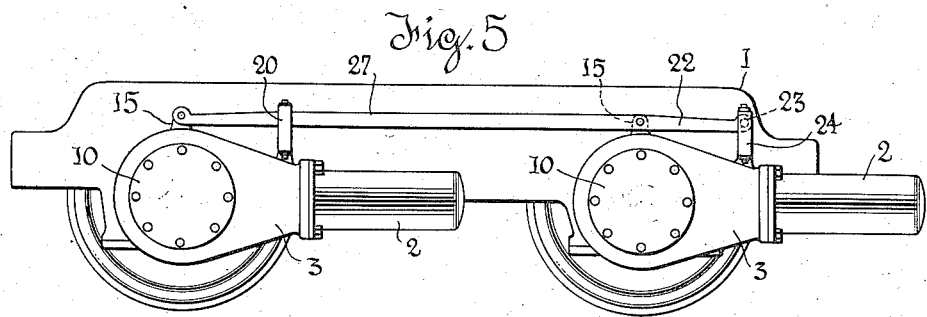
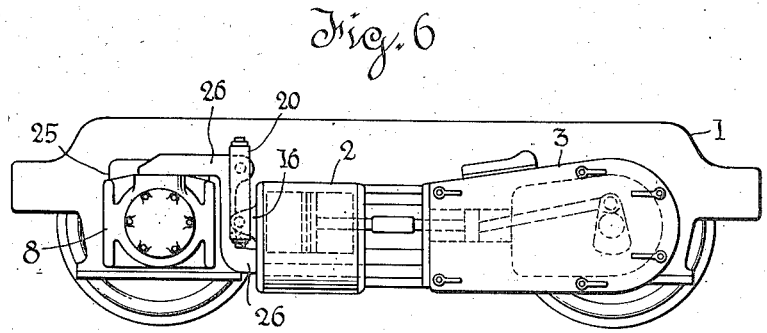
Inventor
William J. Besler
By
Attorney Patented June 23, 1936

2,044,767

UNITED STATES PATENT OFFICE 2,044,767

TRUCK FOR RAIL VEHICLES AND THE LIKE

William J. Besler, Plainfield, N. J., assignor to Besler Systems, Emeryville, Calif., a corporation of California Application March 6, 1934, Serial No. 714,348

12 Claims. (Cl. 105—135)

This invention relates to engine-driven trucks for rail vehicles, and particularly to an engine adapted for such purposes and to the manner of supporting the same on the truck.

One object of the invention is to provide an improved engine mounting and support so arranged that the torque reaction and the unbalanced forces produced by the engine will be transmitted to the track rails and not to the truck frame or to the vehicle carried thereby.

A further object is to improve the construction of the propulsion unit and the accessibility of the engine and its associated parts.

Another object of the invention is to provide an improved construction of the stated character utilizing the conventional journal bearing of a railway truck as the main bearing of an engine mounted thereon.

Another object of the invention is to provide each engine of a propulsion unit with a sealed casing enclosing the journal bearing and other working parts of the engine, whereby these moving parts may be easily lubricated in a bath of oil contained in the sealed casing.

Other objects and advantages of the invention will become apparent from the following detailed description of the embodiments of the invention shown in the accompanying drawings, wherein Figure 1 is a perspective view partly in section of a preferred type of engine and its support;

Figure 3 is a sectional view of one form of the resilient link which may be used;

Figure 4 is a sectional view taken on the horizontal plane of the axle axis of a modified form of the engine support shown in Figure 1;

Figure 5 is a side elevation view of a truck having a one-cylinder engine supported at each wheel; and Figure 6 is a side elevation view of a truck having only one driven axle.

Figure 1:
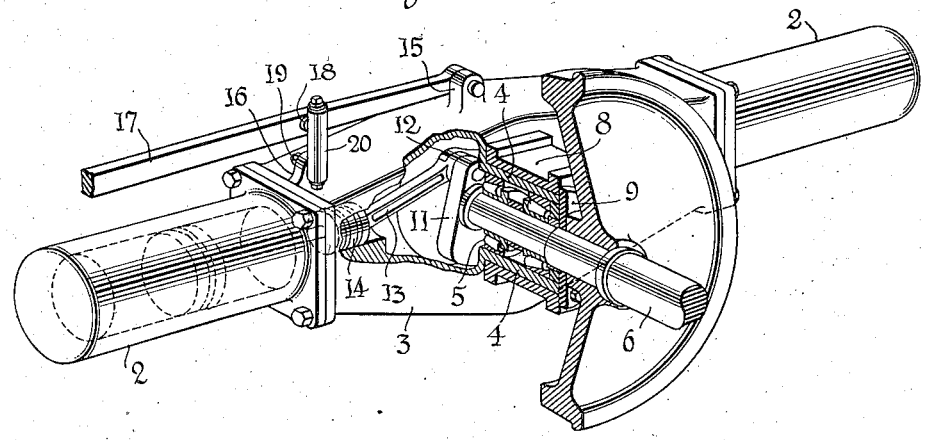

Referring to the drawings, for purposes of illustration, an embodiment of the invention is shown in conjunction with a railway vehicle truck, the frame of which is indicated by the numeral 1. The truck may have one or more axles. The engines used to drive the truck comprise cylinders 2 suitably secured to a crankcase 3. The engines are of the reciprocating type operated by steam or other suitable working fluids, produced by external means or by internal combustion. Suitable valve gear and fluid supply connections are provided, but are not shown in the drawings, as they do not form a part of the invention and may be of conventional character.

It has been found that the engine may be conveniently supported in a position adjacent the stub ends of the truck axles, i. e., outside of the plane of the wheels and journal boxes as distinguished from engines supported in the center of a truck between the wheels. This arrangement has certain outstanding advantages, as will be pointed out hereinafter. The weight of each engine is suported by its crankcase 3 which is provided with a protruding sleeve 4. This sleeve 4 forms a housing for the roller journal bearing 5 provided near each end of the axles 6. The sleeve 4 may be formed integral with the crankcase 3, as shown in Fig. 1, or may well be fashioned in the form of a flanged sleeve 7 to which the crankcase 3 is rigidly secured, as shown in Fig. 4. The engine weight is unsprung and transmitted by the journal bearing housing directly to the axle and wheel.

Surrounding the bearing-housing sleeve 4 is a journal block 8 arranged for vertical movement within guides 25 in the truck frame 1. This permits the axles to have limited vertical movement with respect to the truck frame 1. Suitable springs and equalizer bars are provided between the top of the journal block 8 and the truck frame 1, as is well known in the railway art. A ring 9 is removably secured to the end of the sleeve 4 to retain lubricant in the journal bearing and to exclude foreign matter therefrom. The inside flange on the sleeve 7 may be omitted so that the sleeve may be more easily withdrawn from the journal block 8 when desired.

The outer side of the crankcase 3 is provided with an opening normally closed by a cover plate 10 bolted to the crank case. Removal of this cover plate permits ready access to the roller journal bearings 5 and to the counter-balanced crank 11 secured to the other end of the axle shaft 6, as well as to the connecting rod bearings 12, the connecting rods 13, and the crossheads 14.

The journal bearing 5 not only carries the weight of the truck frame and the vehicle but serves also as the main bearing for the engine supported thereon. A conventional roller journal bearing may be provided which has ample capacity to operate satisfactorily under this combined load.

The use of a combined crank case and journal bearing housing greatly simplifies engine and bearing lubrication. In a propulsion unit of the character described, adequate lubrication presents considerable difficulty particularly where the engine is mounted outside of the plane of the wheels of the truck. In the described construction, this problem is solved in a simple and effective manner by providing a bath of lubricant in the sealed crankcase which encloses the journal bearings, the connecting-rod bearings and the crosshead bearings. The crankcase serves as a lubricant reservoir, the lubricant being splashed upon or conducted to the bearings in any desired manner. Satisfactory operation at high speeds and under the conditions encountered in actual service is thus assured.

Figure 2:
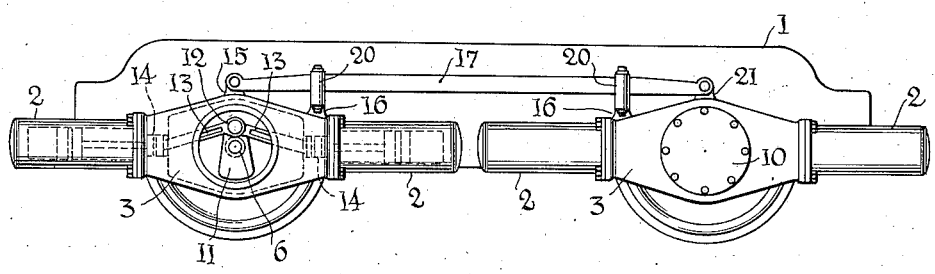
Figure 2 is a side elevation view of a railway truck having engines supported as shown in Figure 1.

From the description thus far, it will be seen that the weight of the engine is supported on an axis coincident with the axis of the axle. The preferred means shown in Figs. 1 and 2, to absorb the engine torque, will now be described in detail:

An upstanding boss 15 is provided on the top of the crankcase 3 vertically above the roller bearing axis. A second boss 16 is provided near the cylinder end of the crankcase. This latter boss 16 may be arranged on the cylinder 2, as shown in Fig. 6, instead of being on the crankcase 3. A horizontal equalizer bar or torque rod 17 is connected at one of its ends to the boss 15 above the axle axis. The rod 17 is provided intermediate of its ends with offset ball elements 18 positioned above similar ball elements 19 secured to the boss 16 on each engine crankcase. An adjustable resilient link 20 may be used to connect the two ball elements 18 and 19, as shown in Fig. 3. The link 20 may, however, be non-resilient. The engine torque reaction is transmitted by means of the link 20 to the torque rod 17. The other end of the rod 17 is connected to a boss 21 on the upper surface of the crankcase 3 of the engine on the other axle of the truck with suitable lost motion in a horizontal plane between the rod 17 and the crankcase to accommodate relative axle motion. By means of these connections to the torque rod 17, the torque of both engines is transmitted to the wheels independently of the frame 1 of the truck. A conventional equalizer bar 26 (Fig. 6) may be used to transmit the torque reaction in a manner similar to the action of torque rod 17 (Figs. 1, 2, and 5). With the engines mounted and supported in the above described manner, practically no engine vibration can be transmitted to the truck frame or to the vehicle carried by the frame. The weight of the engines is unsprung and the variable torque reaction is conducted directly to the rails. Such construction permits the use of lighter vehicle bodies and truck frames because of the substantial reduction in the amount of engine vibration transmitted thereto.

In all of the embodiments and modifications of the invention here described, the engine equipment provided on one side of the railway truck is duplicated on the opposite side of the truck. Each driven axle is provided with a single or multiple cylinder engine on each of its stub ends. The crank on one end of the axle 6 is preferably arranged at a 90° angle from the position of the crank on the other end of the axle.

In the modification illustrated in Fig. 5, a one-cylinder engine is used on each end of each axle. The engine support by the journal bearing housing is the same as for the two cylinder engine support described above. In this modification, however, the horizontal torque rod 27 is extended at one end, as indicated at 22, so as to reach beyond the axle in order to permit linkage with that engine which extends away from the truck axles. This torque rod extension 22 is provided at its outer end with a ball element 23 which engages a link 24 similar to links 20.

In the modification shown in Fig. 6, a one-cylinder engine is used on the ends of only one axle of the truck, the other axle being undriven or driven by chains (not shown) connecting it to the engine driven axle. In this construction, the crankcase is supported by the journal bearing housing above described and the torque reaction is transmitted by means of the link 20 to the conventional equalizer bar 26, ball connection elements being provided on the end of the engine cylinder 2 and on the equalizer bar 26. A rigid link may be used in this construction.

The construction shown and described obviates the necessity for individual main bearings, eliminates gearing, and permits the use of an easily accessible and easily lubricated engine of simple design and few parts. It also insures a constant length piston stroke irrespective of axle movement thereby permitting accurate valve operation. In addition to these advantages, engine vibration is absorbed by the rails and not conducted to the vehicle. The invention contemplates the use of other types of bearings, linkage and connections than those described, as it will be apparent to one skilled in the art that such variations are possible.

I claim:

1. In a railway truck, the combination comprising a frame, load-bearing axles journaled therein, a reciprocating engine directly connected to each end of one of said axles and supported therefrom for pivotal movement with respect to said frame, rods extending between said one of said axles and an adjacent axle and a connection between each engine and the adjacent rod to limit the pivotal movement of said engine and to transmit a part of the torque reaction of the engine to the adjacent axle.

2. In a railway truck, the combination comprising a frame, load-bearing axles journaled therein, reciprocating engines directly connected to the ends of one of said axles, said engines being supported coaxially with said one of said axles for pivotal movement with respect to said frame, torque rods extending between two of said axles adjacent to said engines and a connection between each engine and the adjacent torque rod to limit the pivotal movement of said engines and to transmit the torque reaction of the engine to the axles.

3. In a railway truck, the combination comprising a frame, journal bearings arranged for vertical movement with respect to said frame, load-bearing axles carried in said bearings, reciprocating engines directly connected to the outer ends of said axles and supported by said bearings for pivotal movement with respect to said frame, and torque rods extending between said axles and connected to said engines to limit the pivotal movement of said engines.

4. In a railway truck, the combination comprising a frame, load-bearing axles journaled therein, a reciprocating engine at each end of each axle directly connected thereto and supported thereon for pivotal movement with respect to said frame, a torque rod for each side of the truck, each rod being resiliently connected to those engines on the corresponding side of the truck to transmit the torque reaction of said engines to the axles and to limit the pivotal movement of said engines.

5. In a railway truck, the combination comprising a frame, two load-bearing axles journaled therein, a reciprocating engine on each end of one of said axles directly connected to said axle and supported thereon for pivotal movement with respect to said frame, an equalizer bar on each side of the truck and extending between said axles for supporting said frame, and a connection between each engine and the equalizer bar adjacent thereto.

6. In a railway truck, the combination comprising a frame, load-bearing axles and journal bearings therefor, journal bearing housings arranged for movement with respect to the frame, reciprocating engines directly connected to the outer ends of said axles and supported by the journal bearing housings, a torque rod positioned between engines on different axles and connected to said engines to transmit torque reaction to the axles.

7. In a railway truck, the combination comprising a frame, load-bearing axles arranged therein, journal bearings therefor, an equalizer bar extending between said axles for supporting said frame, a reciprocating engine directly connected to the outer end of one of said axles and supported in part by one of said bearings for pivotal movement with respect to said frame and in part by said equalizer bar.

8. In a railway truck, the combination comprising a frame, load-bearing axles therefor, journal bearings for said axles, reciprocating engines directly connected to the ends of said axles, a crankcase for each of said engines supported for pivotal movement with respect to said frame, bosses positioned on each crankcase and a torque rod extending between the bosses on each of a plurality of said engines and connected thereto.

9. In a railway truck, the combination comprising a frame, load-bearing axles arranged therein, journal bearings on said axles, an equalizer bar between said journal bearings and said frame, a reciprocating engine directly connected to the outer end of one of said axles, a crankcase for said engine, a sleeve encircling the bearing on said one of said axles and rigidly secured to said crankcase, the said engine being connected to said equalizer bar for transmitting engine torque reaction to said bar.

10. In a railway truck, the combination comprising a frame, load-bearing axles therefor, reciprocating engines directly connected to the ends of one of said axles and supported thereon for pivotal movement with respect to said frame, each engine having a sealed crankcase enclosing the end of said one of said axles and forming a lubricant reservoir, and means independent of said truck frame for transmitting torque reaction of each of said engines to another of said load-bearing axles.

11. In a railway truck, the combination comprising a frame, load-bearing axles and journal bearings therefor movable with respect to said frame, a reciprocating engine supported on one of said bearings for pivotal movement with respect to said frame and directly connected to the end of one of said axles, and a sealed crankcase for said engine enclosing said journal bearing and forming a lubricant confining chamber, and means to limit the pivotal movement of said engine.

12. In a railway truck, the combination comprising a frame, load-bearing axles and journal bearings therefor movable with respect to said frame, a reciprocating engine directly connected to the outer end of one of said axles and pivotally supported thereon, said engine having a sealed crankcase enclosing said end of said axle and enclosing one of said journal bearings, and means to limit the pivotal movement of said engine.

WILLIAM J. BESLER.